United States Patent [19]

Bulat

[11] Patent Number: 4,538,063
[45] Date of Patent: Aug. 27, 1985

[54] PHOTO TRANSDUCER CIRCUIT FOR SETTING MINIMUM AND MAXIMUM CURRENT FLOW BETWEEN POWER TERMINALS

[75] Inventor: Bulent Bulat, Derby, Conn.

[73] Assignee: Dresser Industries, Inc., Dallas, Tex.

[21] Appl. No.: 455,679

[22] Filed: Jan. 5, 1983

[51] Int. Cl.³ .................. G05F 1/56; H01J 40/14
[52] U.S. Cl. .................. 250/214 R; 250/209;
   250/231 P; 307/297; 307/311
[58] Field of Search .......... 250/231 P, 231 R, 214 A,
   250/214 R, 208, 209, 205; 307/311, 296 R, 297;
   73/800

[56] References Cited

U.S. PATENT DOCUMENTS

| 3,480,781 | 11/1969 | Mandalakas | 250/209 |
| 3,675,114 | 7/1972 | Nercessian | 307/297 X |
| 3,742,233 | 6/1973 | Gorgens et al. | 250/231 R |
| 4,109,147 | 8/1978 | Heske | 250/231 P |

OTHER PUBLICATIONS

Honeywell "Diffused Silicon ΔPl, PP/1 Transmitters" 1979-FIG. 2 and accompany text 4-20 mA output.
Beckman "Model 8610 Differential Pressure Transmitter" Dwgs. 641342, 644016 and 643460 4-20 mA output.
Rosemount Dwg. 1151-135 Rev. H-"Differential Pressure Transmitter" 4-20 mA output.

Primary Examiner—Edward P. Westin
Attorney, Agent, or Firm—Daniel Rubin

[57] ABSTRACT

A photo transducer circuit (30) selectively controls the current which is transmitted between power terminals (32, 34). A light emitter (20) transmits light to a first photo receiver (24) and a second photo receiver (26). A vane (16) is movable by a Bourdon tube (12) to permit a variable amount of light to pass from the photo emitter (20) to the photo receiver (26). The output of the photo emitter (20) is regulated by a circuit which monitors the output of the photo receiver (24). Circuitry is provided to set a minimum current flow between the power terminals (32, 34) when the vane (16) substantially blocks illumination of the photo receiver (26). Further circuitry is provided to set a maximum current flow between the power terminals (32, 34) when the vane (16) allows substantial exposure of the photo receiver (26) to the light produced by emitter (20). The current passed between the power terminals (32, 34) is proportional to the degree of blockage of the light from the emitter (20) directed toward the photo receiver (26).

10 Claims, 2 Drawing Figures 4,538,063

PHOTO TRANSDUCER CIRCUIT FOR SETTING MINIMUM AND MAXIMUM CURRENT FLOW BETWEEN POWER TERMINALS

TECHNICAL FIELD

The present invention pertains in general to electronic circuits used for measuring and testing and in particular to the translation of mechanical position into a corresponding electrical signal.

BACKGROUND OF THE INVENTION

Photo transducer circuits have previously been used to convert mechanical position into electrical signals. A typical application of such a transducer is in a pressure gauge as described in U.S. Pat. No. 4,109,147 to Heske. The patent to Heske shows a transducer circuit which produces a digital output through a comparison of the outputs from two photo receivers.

Electronic instrumentation, which records parameters such as pressure, frequently require that the output signal from the transducer comprise a current ranging between minimum and maximum values. The transducer must produce a current output which is proportional to the transducer input information but which varies between a fixed minimum and a fixed maximum amplitude.

Therefore, in view of a need for a defined current range signal for use in instrumentation, there is a need for a transducer circuit for converting position information into an electrical signal having a range between a minimum and a maximum value.

SUMMARY OF THE INVENTION

A selected embodiment of the present invention comprises a photo transducer circuit which has first and second power terminals for supply power to the transducer circuit, a photo emitter, a first photo receiver which is positioned to receive output from the photo emitter and circuit means which is responsive to the first photo receiver for regulating the output of the photo emitter. A second photo receiver is positioned to receive a variable amount of the light output from the photo emitter. A current regulating circuit is responsive to the second photo receiver for controlling the amplitude of current flow between the first and second power terminals. Further circuitry is connected to the current regulating circuit for setting a minimum amplitude and a maximum amplitude for the current flow between the power terminals.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
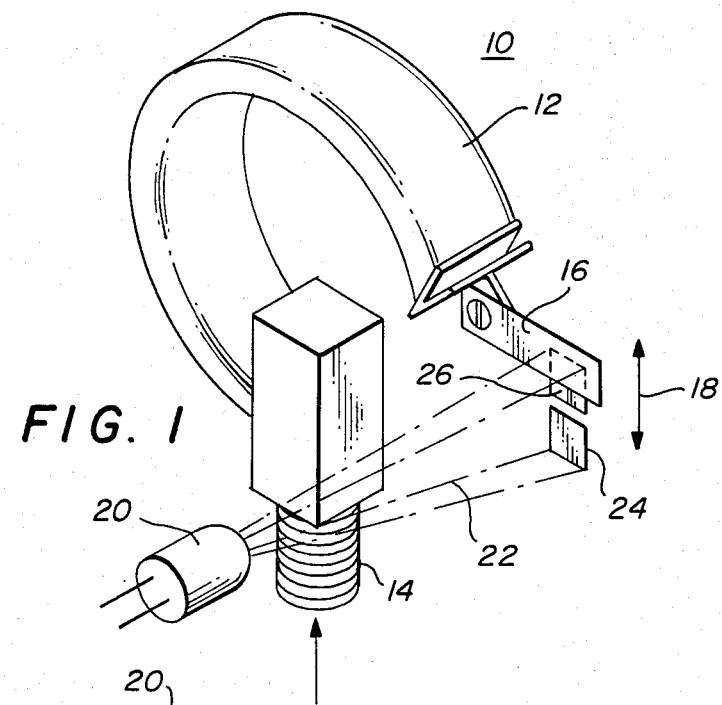
FIG. 1 is a perspective illustration of a Bourdon tube pressure gauge which varies the amount of light provided to a photo receiver by moving the position of an opaque vane.

Referring now to FIG. 1 there is illustrated a Bourdon tube pressure gauge 10 which includes a Bourdon tube 12. The tube 12 is connected to a pressure receiving line 14.

At the opposite end of tube 12 from line 14, there is connected an opaque vane 16. As pressure is applied through line 14, the tube 12 tends to straighten, thereby moving vane 16 upward. The vane 16 translates in the directions indicated by arrow 18.

A photo emitter 20, such as a light emitting diode (LED), produces a light output indicated by lines 22. The light produced by emitter 20 is directed toward photo receivers 24 and 26. The receivers 24 and 26 are preferably photo diodes. The electrical output of the receivers 24 and 26 is proportional to the amount of light received. The full area of the receiver 24 is exposed to the light output from the emitter 20. However, the vane 16 can be positioned to variably block the light output from the emitter 20, which is transmitted toward the receiver 26. Thus, the amount of light provided to the receiver 26 is proportional to the position of the vane 16, which is in turn proportional to the pressure received at line 14. It can be seen that the electrical output of the receiver 26 is proportional to the pressure applied through the pressure receiving line 14.

Figure 2:
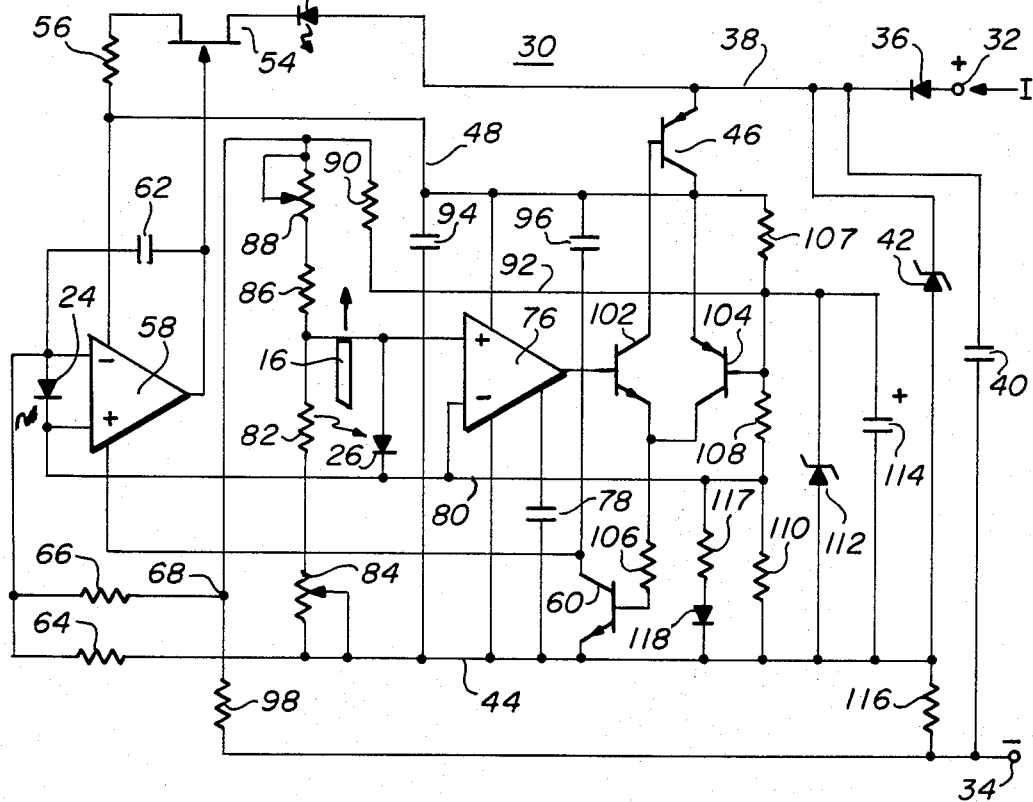
FIG. 2 is a schematic illustration of a photo transducer circuit in accordance with the present invention for controlling the current flow between power terminals as a function of the light provided to a photo receiver.

Referring now to FIG. 2 there is illustrated a schematic diagram for a photo transducer circuit 30 in accordance with the present invention. Power is supplied to the circuit 30 through power terminals 32 and 34. DC power is supplied to circuit 30 and this power is preferably in the range between 12 and 40 volts. The current I which is supplied by the power supply is varied by the circuit 30 in proportion of the position of vane 16.

A reverse supply protection diode 36 is connected serially in the line for the power terminal 32. The diode 36 is connected between terminal 32 and a node 38. A filter capacitor 40 is connected between node 38 and the power terminal 34.

An over voltage protection zener diode 42 is connected between node 38 and a node 44.

A PNP transistor 46 has the emitter terminal thereof connected to node 38 and the collector terminal thereof connected to a node 48.

The photo emitter 20, comprising a light emitting diode, has the anode terminal thereof connected to node 38 and the cathode terminal thereof connected to the drain terminal of a field effect transistor 54. The source terminal of transistor 54 is connected to a first terminal of a resistor 56. The second terminal of resistor 56 is connected to node 48.

An operational amplifier 58 has the positive power terminal thereof connected to node 48 and the negative power terminal thereof connected to the collector terminal of an NPN transistor 60. The anode terminal of the photo receiver 24 is connected to the inverting input of amplifier 58 and the cathode terminal of receiver 24 is connected to the noninverting input of amplifier 58. The output of amplifier 58 is connected to the gate terminal of trnsistor 54. A capacitor 62 is connected between the output of amplifier 58 and its inverting input.

The amplifier 58 responds to the photo receiver 24 to produce an output signal that regulates the current that is passed through the photo emitter 20. The receiver 24 is fully exposed to the light from the photo emitter 20. When the intensity of light striking receiver 24 decreases, the output of amplifier 58 increases, thereby increasing the current's flow through the emitter 20 which in turn increases its light output. When the light output at the receiver 24 increases, the output of the amplifier 58 decreases, therefore reducing the current flow through the transistor 54 and light emitter 20. This operation serves to stabilize the light output from the emitter 20.

A resistor 64 is connected between the inverting input of amplifier 58 and node 44. A resistor 66 is connected between the inverting input of amplifier 58 and a node 68.

An operational amplifier 76 has the positive power terminal thereof connected to node 48 and the negative power terminal thereof connected to node 44. A capacitor 78 is connected between amplifier 76 and node 44 to increase the time constant operation of the amplifier 76.

The photo receiver 26 has the anode terminal thereof connected to the noninverting input of amplifier 76 and the cathode terminal thereof connected to a node 80. The inverting input of amplifier 76 is also connected to node 80. A resistor 82 is connected in series with a potentiometer 84 between the noninverting input terminal of amplifier 76 and node 44. The wiper of potentiometer 84 is also connected to node 44. A resistor 86 is connected in series with a potentiometer 88 between the noninverting input of amplifier 76 and node 68. The wiper of potentiometer 88 is connected to node 68.

A resistor 90 is connected between node 68 and a node 92. A capacitor 94 is connected between node 48 and node 44. A capacitor 96 is connected between node 48 and the collector terminal of transistor 60. The emitter terminal of transistor 60 is connected to node 44. A resistor 98 is connected between node 68 and terminal 34.

The output of amplifier 76 is connected to the base terminal of an NPN transistor 102 which has its collector terminal connected to the base terminal of transistor 46. The collector terminal of transistor 46 is connected to node 48. A PNP transistor 104 has the emitter terminal thereof connected to node 48 and the collector terminal thereof connected to the emitter terminal of transistor 102. A resistor 106 is connected between the emitter terminal of transistor 102 and the base terminal of transistor 60.

A resistor 107 is connected between node 48 and node 92. The base terminal of transistor 104 is also connected to node 92. A resistor 108 is connected between node 92 and node 80. A resistor 110 is connected between node 80 and node 44.

A zener diode 112, functioning as a voltage regulator, is connected between node 92 and node 44. A capacitor 114 is connected between node 92 and node 44. A resistor 116 is connected between node 44 and terminal 34.

A resistor 117 is connected between node 80 and the anode of a diode 118. The cathode of diode 118 is connected to the node 44.

The operation of the photo transducer circuit 30 is now described in reference to the FIGURES. The photo receivers 24 and 26 are matched such that any changes in environment or components will affect both equally. The photo receiver 24 functions as a reference to maintain a constant relationship between the photo emitter 20 and the photo receiver 24. There is thus established the same relative reference between the photo emitter 20 and the photo receiver 26. The emitter 20 is driven to a stable condition by operation of a feedback circuit which includes transistor 54, photo receiver 24 and operational amplifier 58. As noted above, increases or decreases in the light received by photo receiver 24 produce an output from amplifier 58 that drives transistor 54 to compensate for the changing effect. The resistor 56 and capacitor 62 serve to stabilize the feedback loop.

A number of nodes in the circuit 30 are set at reference voltages. The zener diode 112 is selected to set the voltage at node 92 at approximately 5.0 volts relative to the node 44. The forward biased emitter-base junction of transistor 104 serves to set the voltage of node 48 at approximately 5.6 volts relative to node 44. The combination of resistors 108, 110 and 116 together with diode 118 serves to maintain node 80 at approximately 2.5 volts above node 44.

When the circuit 30 is in operation, the transistor 60 is in a forward biased saturation state. However, when power is initially applied to circuit 30, the transistor 60 functions to insure that the circuit does not lock in an inoperative state. Upon the application of power to terminals 32 and 34, the transistor 60 is off. The transistor 54 is normally conductive without a bias voltage at the gate, thus current through transistor 54 tends to elevate the voltage at node 48. If operational amplifier 58 should come on with a negative output, the transistor 54 would be turned off, thereby preventing the charging of node 48 which would prevent operation of circuit 30. However, because transistor 60 is off, the operational amplifier 58 cannot have a negative output but can have only a positive output which tends to turn on the transistor 54 to aid the charging of node 48. Once the circuit 30 begins operation, current will flow through resistor 106 to turn on transistor 60 which will supply a negative power terminal for the amplifier 58, thereby permitting it to function in the method described above.

The photo receivers 24 and 26 are photo diodes which are operable in a short circuit condition across the terminals of the respective operational amplifiers. When light from the emitter 20 falls on one of the photo receivers 24 or 26, the voltage is increased at the anode terminal thereof.

The circuit 30 is designed such that the current through the power terminals 32 and 34 varies between 4 and 20 milliamps with the amplitude of the current being proportional to the extent of light exposure of photo receiver 26. The impedances of resistors 90 and 98 are selected to have values that apply a voltage state to the input terminals of amplifier 76 such that a controlled current flow is produced through transistors 46, 104 and 60 when the vane 16 fully covers the photo receiver 26 such that the total current through resistors 64 and 110, potentiometer 84, transistor 60, diode 118, and zener diode 112 is four milliamps. The four milliamp current flows through resistor 116 and will essentially comprise the total current flowing between the terminals 32 and 34. The impedance of resistor 98 is selected to be approximately 1000 times as great as that of resistor 116, therefore the current flow through resistor 98 is essentially negligible in comparison to the current through resistor 116. The sum of the currents through transistor 46 and photo emitter 20 is also 4 milliamps. Therefore, the current through photoemitter 20 may be any value to a maximum of 4 mA, with transistor 46 providing the difference. Hence, this circuit provides the brightest light source possible, thus improving stability and reducing the need for expensive components.

The primary current path between power terminals 32 and 34 is serially through transistor 46, transistor 104, resistor 106 and transistor 60. The current through this path is controlled by the output of operational amplifier 76. When the output of amplifier 76 increases in voltage, the transistor 102 is turned on to a greater extent which tends to further turn on transistor 46. As transistor 46 becomes more conductive, it sources a greater current from terminal 32 and feeds it to node 48. As greater current is provided to node 48, the drive of transistor 104 is increased so that the increased current from transistor 46 is sourced through transistor 104. The current through transistor 104 is passed through resistor 106 and from there through the base-emitter junction of transistor 60 to the node 44. The current then passes through resistor 116 to the power terminal 34.

The resistors 90 and 98 are selected to obtain a zero potential between nodes 68 and 80 while providing a four milliamp current through resistor 116. The potentiometer 84 is adjusted such that all of the anode current of photo receiver 26 flows through resistor 86 and potentiometer 88. The above selection and adjustment is made while the vane 16 covers a substantial portion of the photo receiver 26.

When the vane 16 is at the opposite extreme position permitting a substantial exposure of the photo receiver 26 to the output of the photo emitter 20, the additional current from the photo receiver 26 passes through resistor 86 and potentiometer 88. The potentiometer 88 is adjusted such that the current through resistor 116 is 20 milliamps. This can be done without affecting the adjustment of potentiometer 84.

The movement of the vane 16 is adjusted so that it neither fully covers nor fully blocks the photo receiver 26. This eliminates troublesome edge effects.

The output of the photo receiver 26 is proportional to the degree of coverage of the receiver 26 by the vane 16. The operational amplifier 76 is driven according to the output of the photo receiver 26. When a greater amount of light is received at the photo receiver 26, the anode terminal thereof increases in voltage thereby driving the output of amplifier 76 to have a more positive voltage. This in turn increases the conductivity of transistor 102 which provides additional drive to transistor 46. If transistor 46 is turned on to a greater degree, there is more current drawn from node 38. This increased current is sourced by transistor 104 and passed through transistor 60 to node 44 as described above. This increased current is then passed through resistor 116 to the power terminal 34. The increased current through resistor 116 reduces the voltage at terminal 34 relative to node 44. This change in voltage is transmitted through resistor 98, potentiometer 88 and resistor 86 to draw the additional current produced at the anode of the photo receiver 26.

When there is a lesser amount of light applied to the photo receiver 26, the voltage at the anode terminal thereof drops thereby driving the output of amplifier 76 more negative. This tends to turn off transistor 102, thereby reducing the drive on transistor 46. With reduced drive, transistor 46 draws less current from node 38 and thereby provides less current through transistor 104, resistor 106 and transistor 60 to node 44. This results in lesser current being passed through resistor 116, thereby lowering the voltage difference between terminal 34 and node 44. This reduced voltage is transmitted through resistor 98, potentiometer 88 and resistor 86 to counteract the current being drawn through the photo receiver 26.

The resistor 66 is optional and when installed is utilized to improve the linearity of the circuit 30. The resistor 66 mixes a fraction of the measuring current produced by photo receiver 26 with the reference current produced by photo receiver 24. This introduces a nonlinearity into the input/output response of the circuit 30 and this can be utilized to compensate for any nonlinearity in the response of the Bourdon tube 12, photo emitter 20, or the photo receivers 24 and 26.

In a representative embodiment of the present invention the following component types are utilized:

photo receivers—24, 26
photo emitter—20
amplifiers—58,76
transistor—54
transistors—60,102
transistor—104
transistor—46
zener diode—112
diodes—36,118
zener diode—42
Vactec, Inc.—21S566
General Electric—F5E1
National Semiconductor—LM11CM
  PN4392
  2N4401
  2N4403
  TIP30C
National Semiconductor—LM336-5
  IN914
  IN5259

In summary, the present invention comprises a photo transducer circuit which produces an output signal wherein the signal current varies between a minimum and a maximum amplitude in proportion to the movement of a vane which blocks the transmission of light between a photo emitter and a photo receiver.

Although one embodiment of the invention has been illustrated in the accompanying Drawings and described in the foregoing Detailed Description, it will be understood that the invention is not limited to the embodiment disclosed, but is capable of numerous rearrangements, modifications and substitutions without departing from the scope of the invention.

I claim:
1. A photo transistor circuit, comprising:
first and second power terminals for supplying power to said transducer circuit,
a photo emitter for producing light,
a first photo receiver positioned to receive light from said photo emitter,
means responsive to said first photo receiver for regulating the amplitude of light produced by said photo emitter,
a second photo receiver positioned to receive a variable amount of the light from said photo emitter,
means responsive to said second photo receiver for controlling the amplitude of current flow between said first and second power terminals wherein said current flow comprises the output signal of said photo transducer circuit, and
means connected to said means responsive to said second photo receiver for setting a minimum amplitude and a maximum amplitude for said current flow between said power terminals.

2. A photo transducer circuit as recited in claim 1 wherein said means responsive to said first photo receiver comprises:
- an operational amplifier having the first and second terminals of said first photo receiver connected between the inverting and noninverting inputs of said operational amplifier,
- a field effect transistor having the gate terminal thereof connected to the output of said operational amplifier and having the drain terminal thereof connected to said photo emitter,
- a resistor connected between the source terminal of said field effect transistor and the power supply terminal of said operational amplifier, and
- a capacitor connected between the output and the inverting input of said operational amplifier.

3. A photo transducer circuit as recited in claim 1 wherein said means responsive to said second photo receiver comprises:
- an operational amplifier having the first and second terminals of said second photo receiver connected between the inverting and noninverting inputs of said operational amplifier,
- means for establishing a reference voltage at a first node relative to a second node,
- a first transistor having the emitter terminal thereof connected to said first power terminal and the collector terminal thereof connected to said first node,
- a second transistor having the base terminal thereof connected to the output of said operational amplifier and the collector terminal thereof connected to the base terminal of said first transistor,
- means for establishing a reference voltage at a third node relative to said second node,
- a third transistor having the emitter terminal thereof connected to said first node, the base terminal thereof connected to said third node and the collector terminal thereof connected to the emitter terminal of said second transistor,
- a fourth node,
- a fourth transistor having the collector terminal thereof connected to said fourth node, the emitter terminal thereof connected to said second node,
- a first resistor connected between the base terminal of said fourth transistor and the collector terminal of said third transistor, and
- a second resistor connected between said second node and said second power terminal.

4. A photo transducer circuit as recited in claim 3 wherein said means for setting a minimum amplitude and a maximum amplitude for said current flow comprises:
- a third resistor having a first terminal thereof connected to said first node,
- a fourth resistor having a first terminal thereof connected to the noninverting input of said operational amplifier,
- a first potentiometer connected between the second terminal of said third resistor and the second terminal of said fourth resistor,
- a fifth resistor connected between said second power terminal and the second terminal of said first fourth resistor,
- a second potentiometer having a first terminal thereof connected to said second node, and
- a sixth resistor connected between the noninverting input of said operational amplifier and the second terminal of said second potentiometer.

5. A photo transducer circuit, comprising:
first and second power terminals for supplying power to said transducer circuit,
- a light emitting diode having the anode terminal thereof connected to said first power terminal,
- a field effect transistor having the drain terminal thereof connected to the cathode terminal of said light emitting diode,
- a first operational amplifier having the output thereof connected to drive the gate terminal of said field effect transistor,
- a first resistor connected between the source terminal of said field effect transistor and the power terminal for said operational amplifier,
- a first capacitor connected between the output and the inverting input of said first operational amplifier,
- a first photo diode having the anode terminal thereof connected to the inverting input of said operational amplifier and the cathode terminal thereof connected to the noninverting input of said operational amplifier,
- a second resistor connected between a first node and the inverting input of said operational amplifier,
- a second node,
- a first transistor having the emitter terminal thereof connected to said first power terminal and the collector terminal thereof connected to said second node,
- a third node,
- a second operational amplifier having the power terminals thereof connected respectively to said first node and said second node,
- a second photo diode having the anode terminal thereof connected to the noninverting input of said second operational amplifier and having the cathode terminal thereof connected to the inverting input of said second operational amplifier,
- a second transistor having the collector terminal thereof connected to the base terminal of said first transistor and having the base terminal thereof connected to the output of said second operational amplifier,
- a third transistor having the emitter terminal thereof connected to said second node, the base terminal thereof connected to said third node and the collector terminal thereof connected to the emitter terminal of said second transistor,
- a fourth transistor having the emitter terminal thereof connected to said first node and the collector terminal thereof connected to the second power terminal of said first operational amplifier,
- a third resistor connected between the base terminal of said fourth transistor and the emitter terminal of said second transistor,
- a fourth resistor connected between said second and said third nodes,
- a fourth node,
- a fifth resistor connected between said third node and said fourth node,
- a sixth resistor connected between said first node and said fourth node,
- a seventh resistor having a first terminal thereof connected to said fourth node, a diode having the anode terminal thereof connected to the second terminal of said seventh resistor and having the cathode terminal thereof connected to said first node, a first zener diode having the anode terminal thereof connected to said first node and the cathode terminal thereof connected to said third node for establishing said third node at a reference voltage relative to said first node, a second capacitor connected in parallel with said first zener diode, a second zener diode having the anode terminal thereof connected to said first node and the cathode terminal thereof connected to said first power terminal, an eighth resistor connected between said first node and said second power terminal, a ninth resistor having the first terminal thereof connected to said third node, a tenth resistor having a first terminal thereof connected to the noninverting input of said second operational amplifier, a first potentiometer connected between the second terminal of said ninth resistor and the second terminal of said tenth resistor, an eleventh resistor connected between the second terminal of said ninth resistor and the second power terminal, a twelfth resistor having a first terminal thereof connected to the noninverting input of said second operational amplifier, a second potentiometer connected between said first node and the second terminal of said twelfth resistor, and a thirteenth resistor connected between the inverting input of said first operational amplifier and the second terminal of said ninth resistor.

6. A method for producing a signal current proportional to an input parameter, comprising the steps of:
   activating a light emitter to produce light,
   receiving a portion of said light at a first photo receiver, said first photo receiver producing an output signal in response to said received light,
   monitoring the output signal of said first photo receiver to produce a control signal for regulating the amplitude of light produced by said light emitter,
   receiving a portion of said light from said light emitter at a second photo receiver wherein the amount of the light received by said second photo receiver is determined by said input parameter, said second photo receiver producing an output signal proportional to the amount of said light received thereat,
   monitoring the output signal from said second photo receiver to control the amplitude of current flow between first and second power terminals wherein said current flow comprises said signal current and is related to said output signal from said second photo receiver, and
   maintaining a minimum amplitude and a maximum amplitude for said current flow between said power terminals.

7. A method as recited in claim 6 wherein the step of monitoring the output signal of said first photo receiver comprises driving the output of an operational amplifier in response to said first photo receiver connected to the input terminals thereof, the output of said amplifier gating the flow of current through a transistor connected serially with said light emitter.

8. A method as recited in claim 7 including the step of momentarily driving said transistor to a conductive state upon application of power to said first and said second power terminals.

9. A method as recited in claim 6 wherein the step of monitoring the output signal from said second photo receiver comprises driving the output of an operational amplifier in response to said second photo receiver connected to the input terminals of said operational amplifier, the output of said operational amplifier driving a plurality of transistors to control the current flow between said first and second power terminals.

10. A method as recited in claim 9 wherein the step of establishing a minimum amplitude and a maximum amplitude for said current flow comprises selecting appropriate resistances in a resistor network connected to the input terminals of said operational amplifier to set said minimum amplitude and said maximum amplitude for said current flow between said power terminals.

* * * * *